United States Patent
Wang et al.

(10) Patent No.: US 12,225,116 B1
(45) Date of Patent: Feb. 11, 2025

(54) QUANTUM KEY DISTRIBUTION NETWORK WITH CENTRALIZED OPTICAL PULSE GENERATION

(71) Applicant: CABLE TELEVISION LABORATORIES, INC., Louisville, CO (US)

(72) Inventors: Jing Wang, Broomfield, CO (US); Bernardo Huberman, Palo Alto, CA (US)

(73) Assignee: Cable Television Laboratories, Inc., Louisville, CO (US)

( * ) Notice: Subject to any disclaimer, the term of this patent is extended or adjusted under 35 U.S.C. 154(b) by 244 days.

(21) Appl. No.: 18/073,240

(22) Filed: Dec. 1, 2022

Related U.S. Application Data

(63) Continuation-in-part of application No. 17/951,968, filed on Sep. 23, 2022.

(60) Provisional application No. 63/284,732, filed on Dec. 1, 2021, provisional application No. 63/247,612, filed on Sep. 23, 2021.

(51) Int. Cl.
*H04B 10/70* (2013.01)
*H04L 9/08* (2006.01)

(52) U.S. Cl.
CPC .......... *H04L 9/0852* (2013.01); *H04B 10/70* (2013.01)

(58) Field of Classification Search
None
See application file for complete search history.

(56) References Cited

U.S. PATENT DOCUMENTS

| | | | |
|---|---|---|---|
| 7,781,754 B2 * | 8/2010 | Loss | B82Y 10/00 257/E21.089 |
| 9,374,376 B2 | 6/2016 | Hunt et al. | |
| 10,171,238 B2 * | 1/2019 | Howe | H04L 9/0858 |
| 11,271,661 B2 * | 3/2022 | Yoshino | H04B 10/70 |
| 11,309,970 B2 * | 4/2022 | Woodward | H04B 10/70 |
| 11,496,225 B2 * | 11/2022 | Rahman | H04B 10/70 |
| 11,888,978 B1 * | 1/2024 | Wang | H04L 9/0852 |

(Continued)

OTHER PUBLICATIONS

Liu, Yang, et al., Experimental Measurement-Device-Independent Quantum Key Distribution, Physical Review Letters, PRL 111, 130502 (2013), Sep. 27, 2013.

(Continued)

*Primary Examiner* — Jai M Lee
(74) *Attorney, Agent, or Firm* — Cozen O'Connor

(57) ABSTRACT

A method performed by a node of a quantum key distribution (QKD) network includes receiving, from a hub of the QKD network, a user-node pulse train of optical-pulse pairs, each of the optical-pulse pairs comprising a first pulse and a second pulse having an optical phase shift relative to the first pulse. The method further includes splitting the user-node pulse train into first and second pulse trains, calibrating an asymmetric Mach-Zehnder interferometer with the first pulse train, blocking the second pulse of each of the optical-pulse pairs of the second pulse train to generate a filtered pulse train, splitting the filtered pulse train into a timing pulse train and a pre-qubit pulse train, delaying the pre-qubit pulse train into a delayed pulse train, and encoding the delayed pulse train into a photonic-qubit pulse train and transmitting the photonic-qubit pulse train to the hub.

26 Claims, 8 Drawing Sheets

(56) References Cited

U.S. PATENT DOCUMENTS

2023/0393335 A1   12/2023   Challener et al.

OTHER PUBLICATIONS

Lo, Hoi-Kwong, et al., Measurement device independent quantum key distribution, May 28, 2012.
Tang, Yan-Lin, et al., Measurement-Device-Independent Quantum Key Distribution over 200 km, Physical Review Letters, PRL 113, 190501, Nov. 7, 2014.
Tang, Yan-Ling, et al., Measurement-Device-Independent Quantum Key Distribution over Untrustful Metropolitan Network, Physical Review X 6, 011024, Mar. 4, 2016.
Xu, Feihu, et al., Measurement-device-independent quantum cryptography, IEEE Jornal of Selected Topics in Quantum Electronics, Aug. 2014.

* cited by examiner

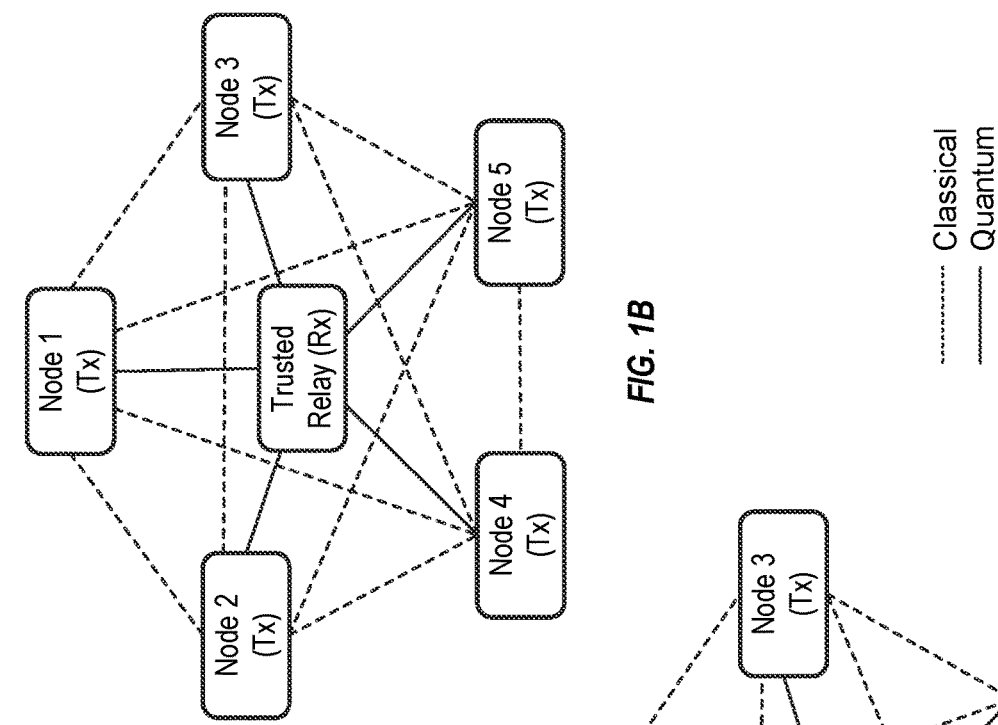
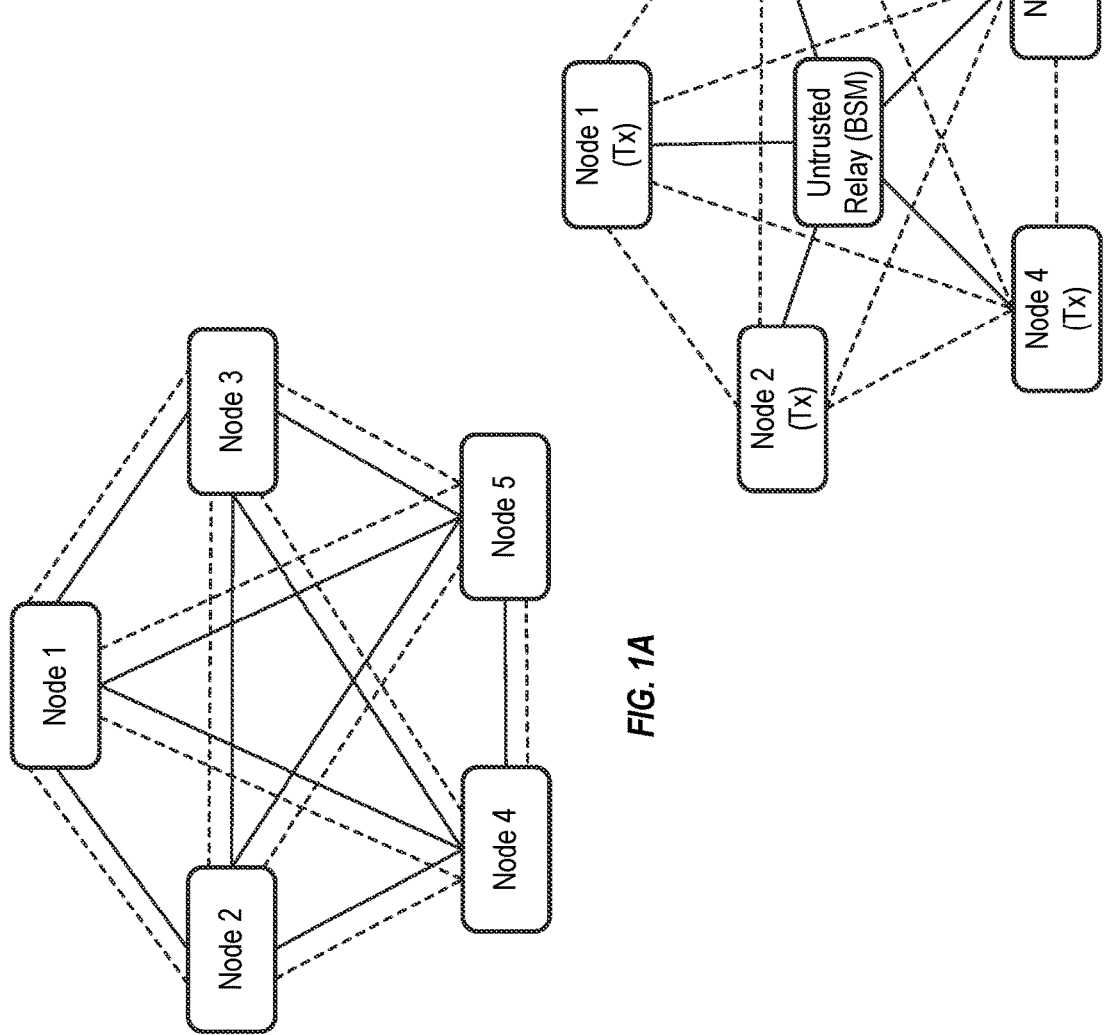
FIG. 1A
FIG. 1B
FIG. 1C

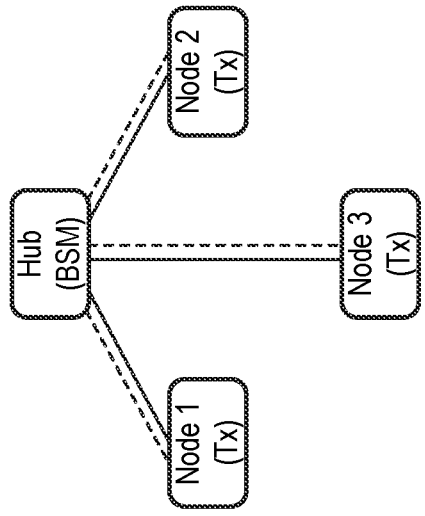
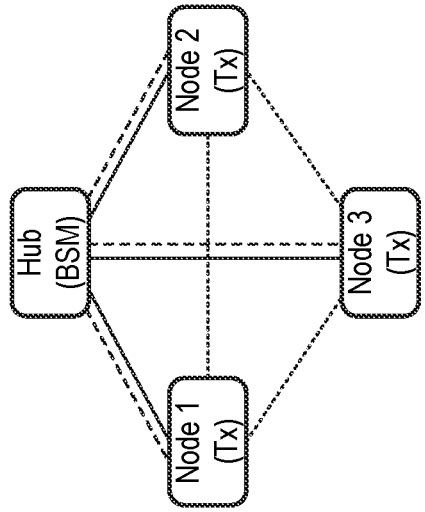
FIG. 2B
FIG. 2A

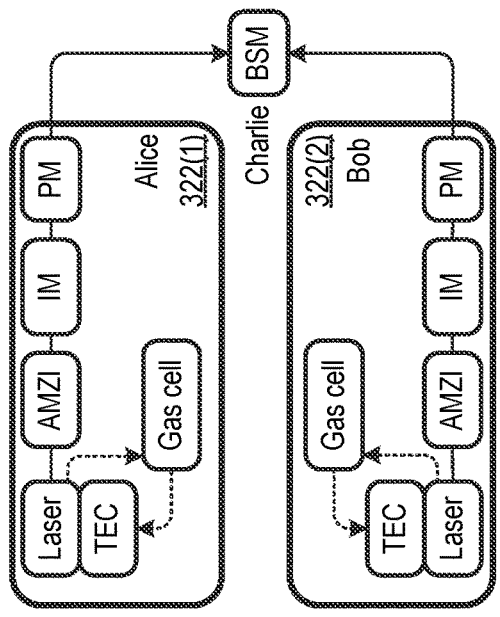
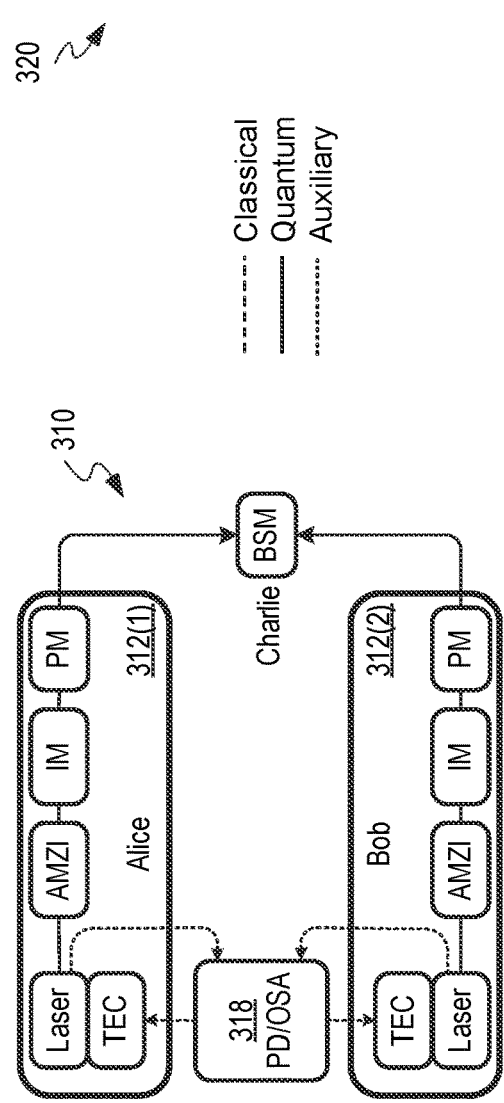
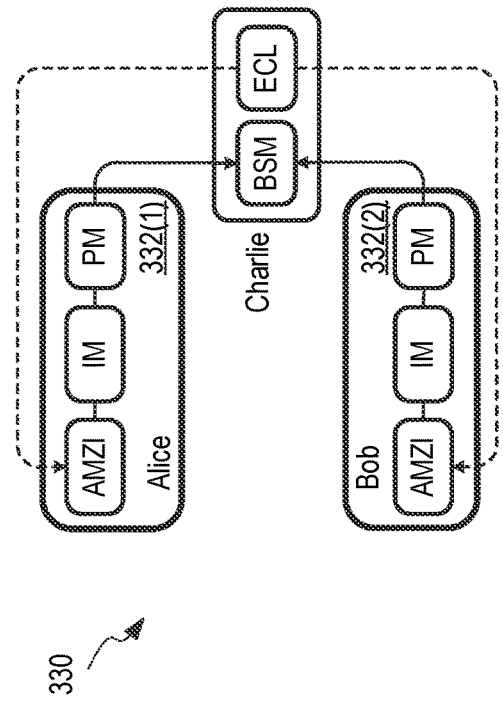
*FIG. 3A*
*FIG. 3B*
*FIG. 3C*

------- Classical
——— Quantum
-·-·-·- Auxiliary

QUANTUM KEY DISTRIBUTION NETWORK WITH CENTRALIZED OPTICAL PULSE GENERATION

RELATED APPLICATIONS

This application claims priority to U.S. Provisional Patent Application No. 63/284,732, filed on Dec. 1, 2021. This application is also a continuation-in-part of U.S. patent application Ser. No. 17/951,968, filed on Sep. 23, 2022, which claims priority to U.S. Provisional Patent Application No. 63/247,612, filed on Sep. 23, 2021. Each of the aforementioned applications is incorporated herein by reference in its entirety.

BACKGROUND

Classical cryptography relies on the computational complexity of intractable mathematical problems to protect keys, such as integer factorization for RSA algorithm, discrete logarithm for Diffie-Hellman key exchange, and elliptic-curve discrete logarithm for elliptic-curve cryptography. Although intractable on classical computers, these problems can be solved in polynomial time on a quantum computer. Even worse, increasing the key length, which used to be an effective countermeasure to deal with ever-growing computational power, does not help since the required qubit number on a quantum computer only scales linearly with the key length.

Quantum key distribution (QKD) is a prominent candidate to address the challenge of quantum computers. Instead of computational security, it guarantees information-theoretic security by quantum mechanics, i.e., a key cannot be broken even if the adversary has unlimited computing power. However, the absolute security of QKD is only guaranteed for ideal single-photon sources and detectors, which do not exist in practice. The gaps between ideal and realistic devices become the new security loopholes and may be exploited for side-channel attacks. For example, weak coherent pulses (WCPs) are used as a low-cost replacement for a single-photon source. Its photon number per pulse follows the Poisson distribution and the multi-photon pulses could become the target of a photon-number-split attack. Decoy-state protocols were invented to vary the photon number per pulse to eliminate this loophole. Another example is that an ideal single-photon source should have random phases for each pulse, but in practice, the phase of a WCP is not truly random, which could become the target of an unambiguous-state-discrimination attack. This loophole can be patched by using directly modulated lasers (DML) or phase modulators for active phase randomization. So far, all loopholes on the photon source side have been addressed and security loopholes only originate from imperfections of detectors, e.g., the time-shift attack exploits the efficiency mismatch between detectors, the detector blinding attack exploits the after-gate pulses and dead time of avalanche photon detectors (APD).

Measurement-device-independent (MDI) QKD protocols were proposed to remove loopholes on the detector side. In conventional prepare-and-measure QKD protocols, a user, Alice, prepares and sends quantum states to another user, Bob, who performs measurements on the received states. In an MDI-QKD protocol, Alice and Bob prepare random quantum states independently and send their photons to a third party, Charlie, who performs a Bell-state measurement (BSM) with the photons. Charlie only publicly announces the results of successful BSMs. Since Charlie only knows whether a successful BSM was performed, but cannot tell the qubits from Alice and Bob, he serves as an untrusted relay that could even be in the control of an eavesdropper. The post-selection of successful BSMs entangles the qubits from Alice and Bob, which is why MDI-QKD is equivalent to a time-reversed entangled-photon-pair (EPR) protocol. During the key sifting, Alice and Bob only keep those bits for successful BSMs as the raw keys and discard the others. During the basis reconciliation, Alice and Bob reveal their choices of bases via an authenticated public channel and only keep those bits in which they use identical bases. After that, post-processing including error correction and privacy amplification is performed for the final key distillation.

Since there is no key leakage at the relay node, MDI-QKD closes all detection loopholes and is immune to side-channel attacks even if the detection system is controlled by an eavesdropper. For standardizing QKD, certification of detection systems has been a major hurdle since detector manufacturers can leave backdoors and steal key information from these loopholes. MDI-QKD solves this problem since there is no need for detector certification.

Despite the advantages of MDI-QKD, it is difficult to scale MDI-QKD to a full network. Since MDI-QKD requires indistinguishability between the photons from the users in terms of time, phase, polarization, and wavelength, conventional implementations of an MDI-QKD network require auxiliary links between each pair of users. As each user has an independent laser, these auxiliary links are used to guarantee that photons from different users arrive with identical timing, phase, polarization, and wavelength. Consequently, when a new node is added, a new auxiliary link is required from each existing node in the network to the new node. This requirement causes the number of auxiliary links to scale quadratically with the number of nodes in the network and makes a scalable implementation of MDI-QKD network difficult.

SUMMARY

The present embodiments include systems and methods for a scalable time-bin phase-encoding measurement-device-independent (MDI) quantum key distribution (QKD) network utilizing centralized wavelength and phase calibration. Using centralized calibration method, the wavelength and phase of all users are calibrated with respect to a relay node or hub. Wavelength calibration is implemented by centralized optical pulse generation, where each user receives the pulses from a shared reference laser at the relay node and reuses these pulses as the quantum photon source. Phase calibration is realized by a centralized reference asymmetric Mach-Zehnder interferometer (AMZI) at the relay node. For each user, a user AMZI is used to calibrate the phase shift with respect to the reference AMZI. Both wavelength and phase calibration links are integrated into existing classical fibers from each user to the relay node, such that no auxiliary links among users are needed. The present embodiments simplify the topology of MDI-QKD networks, lower deployment costs, and makes a scalable multi-user QKD network possible.

In embodiments, a method performed by a node of a quantum key distribution network includes receiving, from a hub of the quantum key distribution network, a user-node pulse train of optical-pulse pairs, each of the optical-pulse pairs comprising a first pulse and second pulse that is temporally delayed relative to the first pulse. The second pulse has an optical phase shift relative to the first pulse. The method further includes splitting the user-node pulse train into first and second pulse trains and calibrating an AMZI with the first pulse train such that an interferometer phase shift between first and second arms of the AMZI matches the optical phase shift. The method further includes blocking the second pulse of each of the optical-pulse pairs of the second pulse train to generate a filtered pulse train, splitting the filtered pulse train into a timing pulse train and a pre-qubit pulse train, detecting the timing pulse train to generate an electronic timing signal, and delaying the pre-qubit pulse train into a delayed pulse train. The method further includes encoding, based on the electronic timing signal and using the AMZI, the delayed pulse train into a photonic-qubit pulse train and transmitting the photonic-qubit pulse train to the hub.

In embodiments, a node for a quantum key distribution network includes an optical input, first and second beamsplitter, a modulator, a photodetector, an optical delay, a qubit encoder, a phase calibrator, and an optical output. The optical input receives, from a hub of the quantum key distribution network, a user-node pulse train of optical-pulse pairs, each of the optical-pulse pairs comprising a first pulse and a second pulse that is temporally delayed relative to the first pulse, where the second pulse has an optical phase shift relative to the first pulse. The first beamsplitter is configured to split the user-node pulse train into first and second pulse trains. The modulator blocks the second pulse of each of the optical-pulse pairs of the second pulse train to generate a filtered pulse train. The second beamsplitter is configured to split the filtered pulse train into a timing pulse train and a pre-qubit pulse train. The photodetector detects the timing pulse train to generate an electronic timing signal. The optical delay delays the pre-qubit pulse train into a delayed pulse train. The qubit encoder includes an AMZI and encodes, based on the electronic timing signal, the delayed pulse train into a photonic-qubit pulse train. The phase calibrator calibrates the AMZI with the first pulse train such that an interferometer phase shift between first and second arms of the AMZI matches the optical phase shift. The optical output transmits the photonic-qubit pulse train to the hub.

In embodiments, a method performed by a hub of a quantum key distribution network includes transforming, with an AMZI, an optical pulse train into a double pulse train of optical-pulse pairs, each of the optical-pulse pairs comprising a first pulse and a second pulse that is temporally delayed relative to the first pulse, where the second pulse has an optical phase shift relative to the first pulse. The method further includes splitting the double pulse train into a first-node pulse train and a second-node pulse train, transmitting the first-node pulse train to a first node of the quantum key distribution network, the first node transforming the first-node pulse train into a first photonic-qubit pulse train, transmitting the second-node pulse train to a second node of the quantum key distribution network, the second node transforming the second-node pulse train into a second photonic-qubit pulse train, receiving the first photonic-qubit pulse train from the first node, receiving the second photonic-qubit pulse train from the second node, and performing a partial Bell-state measurement with a first photonic qubit of the first photonic-qubit pulse train and a second photonic qubit of the second photonic-qubit pulse train, where the first and second photonic qubits are at least partially indistinguishable.

In embodiments, a hub for a quantum key distribution network includes an AMZI, a beamsplitter, first and second optical outputs, first and second optical inputs, and a Bell-state measurement module. The AMZI transforms an optical pulse train into a double pulse train of optical-pulse pairs, each of the optical-pulse pairs comprising a first pulse and a second pulse that is temporally delayed relative to the first pulse, where the second pulse has an optical phase shift relative to the first pulse. The beamsplitter splits the double pulse train into a first-node pulse train and a second-node pulse train. The first optical output transmits the first-node pulse train to a first node of the quantum key distribution network such that the first node transforms the first-node pulse train into a first photonic-qubit pulse train. The second optical output transmits the second-node pulse train to a second node of the quantum key distribution network such that the second node transforms the second-node pulse train into a second photonic-qubit pulse train. The first optical input receives the first photonic-qubit pulse train. The second optical input receives the second photonic-qubit pulse train. The Bell-state measurement module performs a partial Bell-state measurement with a first photonic qubit of the first photonic-qubit pulse train and a second photonic qubit of the second photonic-qubit pulse train, where the first and second photonic qubits are at least partially indistinguishable.

BRIEF DESCRIPTION OF THE FIGURES

FIG. 1A shows a point-to-point network topology.

FIG. 1B shows a trusted-relay network topology in which each user node exchanges keys with a trusted relay node.

FIG. 1C shows an untrusted-relay network topology for measurement-device-independent quantum key distribution (MDI-QKD).

FIG. 2A is an example diagram of an MDI-QKD network showing auxiliary service channels.

FIG. 2B is an example diagram showing a scalable architecture for MDI-QKD network.

FIG. 3A shows an MDI-QKD network that performs wavelength calibration by measuring the wavelength difference, or beat frequency, between two user nodes.

FIG. 3B shows an MDI-QKD network that performs wavelength calibration by laser locking to an atomic or molecular absorption line at each user node.

FIG. 3C shows an MDI-QKD network that performs wavelength calibration using centralized optical pulse generation, in embodiments.

DETAILED DESCRIPTION

Figure 4A:
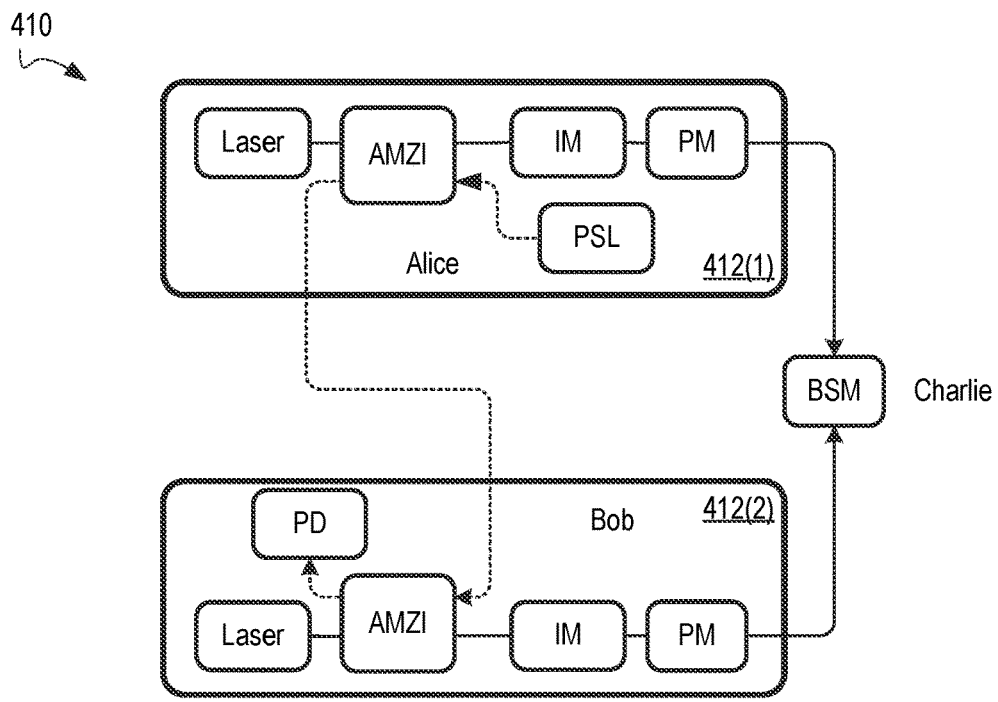
FIGS. 4A and 4B show example implementations that each performs phase calibration of an MDI-QKD network.

In a scalable architecture for measurement-device-independent quantum key distribution (MDI-QKD), user nodes are connected to an untrusted central hub, Charlie. When a user, Alice, wants to transmit a quantum key to another user, Bob, Alice generates photonic qubits that she transmits to Charlie via an optical fiber. Bob similarly generates photonic qubits that he transmits to Charlie via optical fiber. Charlie performs Bell-state measurements with Alice's and Bob's qubits and publicly announces whether each measurement was successful. To enhance success of the Bell-state measurements, Alice's and Bob's qubits should be indistinguishable to Charlie. For example, both qubits have the same wavelength/frequency, arrival time, polarization, and phase.

The following description includes devices and methods that allow Alice and Bob to have the same wavelength/frequency, time delay, polarization, and phase of their transmitted qubits, thereby ensuring indistinguishability to Charlie. The present embodiments are applicable to all encoding schemes used for MDI-QKD including polarization encoding and time-bin phase-encoding. In an example implementation, Charlie transmits optical pulses from a laser to both Alice and Bob by first splitting the output of the laser and modulating each output into optical pulses before sending the optical pulses to Alice and Bob. Alice and Bob then encode the received optical pulses into photonic qubits and transmit the photonic qubits to Charlie. By encoding the received optical pulses into photonic qubits, both received photonic qubits maintain the same wavelength. Charlie may delay, depending on distances to Alice and Bob, sending one or both optical pulses to maintain the same arrival time for the photonic qubits from Alice and Bob.

Advantageously, the present embodiments enable scalable MDI-QKD networks by eliminating the need for auxiliary channels between Alice and Bob. Each new node added to the network requires only one uplink and one downlink between the new node and Charlie, and thus the number of links scales linearly with the number of users (i.e., is "scalable"). By contrast, for a network with auxiliary channels between all pairs of users, the number of links scales quadratically with the number of users. The present embodiments therefore reduce the number of links needed to implement an MDI-QKD network and, as a result, reduce cost and simplify network maintenance.

FIG. 1A shows a point-to-point network topology. Most prepare-and-measure QKD protocols utilize this point-to-point network topology and cannot handle more complicated topologies. In FIG. 1A, each classical communication link needs a dedicated quantum link for key exchange. Accordingly, the number of quantum links increases quadratically with the number of user nodes. As a result, the point-to-point network topology is expensive and impractical to deploy even though it is resilient against cyber-attacks since one compromised user node does not affect the security of the other user nodes.

FIG. 1B shows a trusted-relay network topology in which each user node exchanges keys with a trusted relay node. This topology simplifies the QKD network by reducing the number of quantum links. Specifically, only one quantum link is needed when adding a new user node. Given the imbalanced hardware requirements of WCP sources and single-photon detectors (SPDs), expensive SPDs are concentrated in the relay node and shared among multiple user nodes, leaving only WCP sources at each user node. This topology reduces system cost and eases deployment but places the overall network security solely on the relay node. Since the relay node knows all the keys, once it is compromised, the whole network is breached.

FIG. 1C shows an untrusted-relay network topology for MDI-QKD. By replacing the trusted relay node with an untrusted relay node, any two user nodes can exchange their keys via the untrusted relay node without any information being leaked. In MDI-QKD, two user nodes send independently prepared quantum states to the untrusted relay node. The untrusted relay node is used as a public detection server to perform BSM on the incoming WCPs and publicize whether the BSMs were successful. Since the untrusted relay node has no information about the states that Alice and Bob sent, it does not need to be trusted or certified. MDI-QKD is more resilient than the trusted-relay topology of FIG. 1C since an attack on the untrusted relay node provides no information about the keys.

FIG. 2A is an example diagram of an MDI-QKD network showing auxiliary service channels. Despite the advantages of MDI-QKD, no scalable architecture for MDI-QKD networks has yet been discovered. This is because existing MDI-QKD networks need additional classical communication links between every pair of user nodes. These additional links, referred to as auxiliary service channels, are shown in FIG. 2A. To guarantee the indistinguishability of WCPs, these auxiliary service channels are used for timing, wavelength, and polarization calibrations between user nodes. Every time a new user node is added to the network, new auxiliary links need to be deployed to all existing user nodes. The total number of auxiliary links therefore increases quadratically with the number of users.

FIG. 2B is an example diagram showing a scalable architecture for MDI-QKD network. In the scalable architecture, auxiliary service channels are advantageously incorporated into existing classical communication links between each user node and the relay, as shown in FIG. 2B. By removing auxiliary service links, the network topology is simplified and easier to deploy and service. When a new user node is added, only one classical link and one quantum link are needed.

In MDI-QKD systems, to guarantee the indistinguishability between photons from independent lasers of two users, timing, wavelength, and polarization calibrations between two lasers are needed. While delay and polarization control techniques are mature and well-known in the art, wavelength and phase calibrations remain a challenge. The embodiments below describe methods to calibrate wavelengths and phase among users.

FIGS. 3A, 3B, and 3C show examples of time-bin and phase-encoding MDI-QKD networks that perform wavelength calibration. Each example network has two user nodes, Alice and Bob, and one relay node, Charlie. Each user node has an interferometer, an intensity modulator (IM), and a phase modulator (PM). In certain embodiments, the interferometer is an asymmetric Mach-Zehnder interferometer (AMZI), as shown in FIGS. 3A, 3B, and 3C. In such embodiments, the two arms of the AMZI have unbalanced lengths, and the path length difference may be longer than the coherence time of a pulse. When a pulse passes through an AMZI, it is separated into two time-bins due to the unbalanced lengths of the two arms. Two conjugate bases, time-bin and phase, are used as the Z and X bases, respectively, of the interferometer. For the Z basis, key bits are encoded on the two time-bins, where an IM allows the pulse in only one time-bin to pass and blocks the other. For the X basis, key bits are encoded on the relative phase (0, x) between two time-bins by the PM. The phase shift between the two pulses fluctuates with temperature and fiber stress and may introduce error to key bits in the X basis. To minimize such temperature- and stress-induced perturbations, the AMZIs may be put in thermal containers with phase calibration. Details of operation for each network are explained below.

FIGS. 3A and 3B show existing techniques for wavelength calibration. Both techniques utilize similar laser diodes at each user node to ensure that their central wavelengths and full widths at half maximum are as close to each other as possible. When the wavelengths are the same (e.g., to within a threshold or tolerance level), the wavelengths are said to be calibrated. Each laser diode may include, or be in contact with, a thermoelectric cooler (TEC) or heater to tune its wavelength by controlling its temperature. For example, the central wavelength may be tuned by a built-in TEC, such that the wavelength increases linearly with the temperature at a rate of 0.08-0.1 nm per 1° C.

FIG. 3A shows an MDI-QKD network 310 that performs wavelength calibration by measuring the wavelength difference, or beat frequency, between two user nodes 312(1) and 312(2). The difference is measured by an optical detector 318 that includes a photodetector (PD) or an optical spectrum analyzer (OSA). When the detector 318 is a PD, the beat frequency is measured between the lasers from each user (Alice and Bob). The outputs of Alice's and Bob's lasers are combined at the PD to create the beat note, whose frequency is monitored. When using an OSA, the OSA directly measures the wavelength difference. if the difference in frequency between Alice's and Bob's lasers exceeds a threshold (e.g., 10 MHZ), a feedback control circuit adjusts the TEC of one or both of the lasers to bring their wavelengths back into calibration. This technique may be suitable for a laboratory environment but is expensive due to the cost of OSA, and the precision of the wavelength control may be limited by the resolution of the OSA. Furthermore, this technique is not scalable since a PD/OSA and feedback circuit are needed in the auxiliary link between the users.

FIG. 3B shows an MDI-QKD network 320 that performs wavelength calibration by locking laser frequency to an atomic or molecular absorption line at each of the user nodes 322(1) and 322(2). A vapor cell containing a gas, such as HCN, is integrated into the laser system and used to lock the laser frequency to a molecular absorption line. This solution results in high precision and stability of wavelength control and eliminates any auxiliary link among users. However, it is not cost-effective for real-world deployment due to the high cost of the gas cell and the optics needed to probe and detect the absorption line for each frequency-locked laser.

FIG. 3C shows an MDI-QKD network 330 that performs wavelength calibration using centralized optical pulse generation. In the MDI-QKD network 330, an external cavity laser (ECL) at the relay node sends pulses to each of the user nodes 332(1) and 332(2) via existing classical fiber links, where the pulses are used as a light source for the following intensity/polarization modulation and serve as the clock reference for time calibration. Since this method of wavelength calibration uses existing classical links between the relay node and the user nodes, this solution needs no auxiliary links. This solution not only simplifies the network topology but also lowers the cost of each user. Compared with the implementations shown in FIGS. 3A and 3B, the cost of an ECL is significantly lower than frequency-locked lasers or deploying auxiliary service links. More importantly, the cost of an ECL is shared by multiple users. Advantageously, in some existing networks, ECLs are already equipped at the hub for classical communications, which further reduces deployment cost.

Figure 4B:
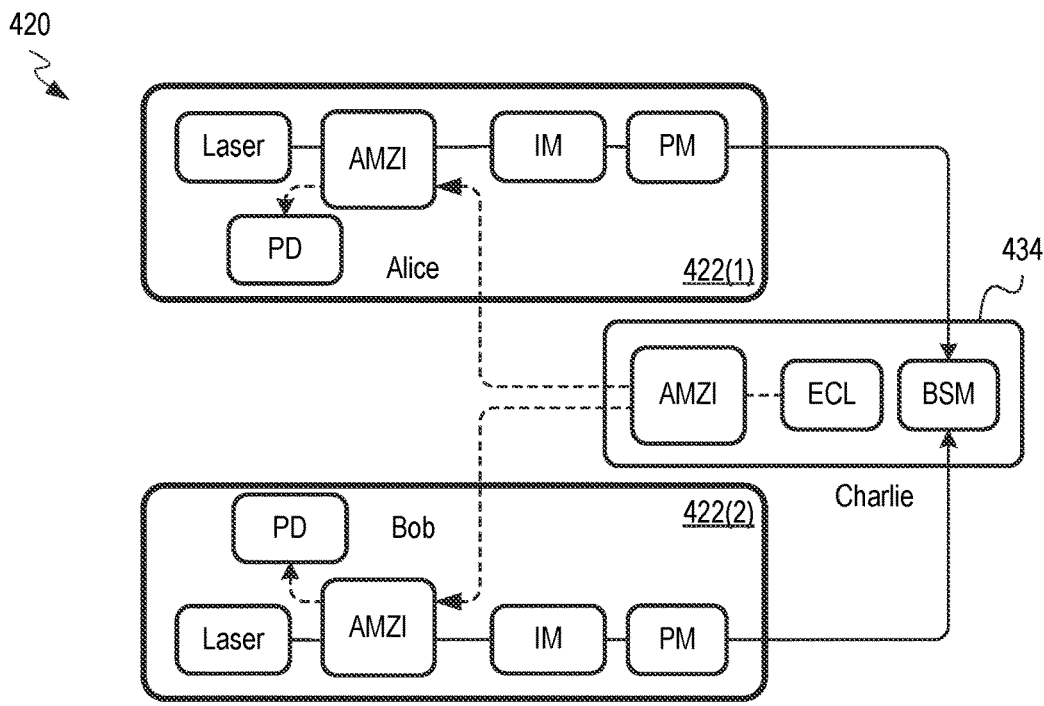

For phase calibration, FIGS. 4A and 4B show example implementations of MDI-QKD networks 410 and 420. The MDI-QKD network 410 performs phase calibration through a use of a phase stabilization laser (PSL). In the MDI-QKD network 410, Alice has a PSL with an identical wavelength as the quantum photon source to send pulses passing through AMZIs in both user nodes 412(1) and 412(2), Alice and Bob. To avoid interference, phase calibration pulses propagate through each AMZI in the opposite direction to that of the qubits. By measuring the output power at an output port of Bob's AMZI with a PD, and adjusting the phase shifter in Bob's AMZI, the phase shift of Bob's AMZI is calibrated relative to Alice's AMZI. However, this method is difficult to scale since, in addition to having a PSL or a PD for each user node, an auxiliary fiber between each pair of users needs to be deployed.

In FIG. 4B, the MDI-QKD network 420 implements centralized phase calibration. Unlike the MDI-QKD network 410, the MDI-QKD network 420 includes, at a relay node 434, an ECL that also serves as a PSL and an AMZI that serves as a shared reference to calibrate all user nodes 422(1) and 422(2). The output pulses of the ECL are sent from the relay node to all user nodes using classical fibers. To avoid interference, the output pulses propagate through Alice and Bob's AMZIs in the opposite direction to their qubits. Each user node monitors the output power of its AMZI and adjusts the inside phase shifter accordingly. Advantageously, unlike the MDI-QKD network 410, centralized phase calibration of the MDI-QKD network 420 is scalable since the network does not require any auxiliary fiber links among user nodes.

Among the examples shown above, FIGS. 3C and 4B utilize centralized wavelength and phase calibration techniques, in which all user nodes are calibrated with respect to the relay node. These centralized calibration techniques integrate wavelength and phase calibration channels into classical fibers between the user nodes and the relay node while removing all auxiliary links among users. For example, the MDI-QKD network 330 uses a shared ECL at the relay node as the common photon source for wavelength calibration. For phase calibration, the MDI-QKD network 420 uses an ECL and a shared reference AMZI at the relay node, where the AMZI in each user node is calibrated with respect to the reference AMZI. In contrast to existing MDI-QKD networks, such as the MDI-QKD networks 310, 320, and 410, the centralized calibration of the MDI-QKD networks 330 and 420 simplify the network topology significantly, reduce the deployment cost, and make MDI-QKD networks more scalable.

Figure 5:
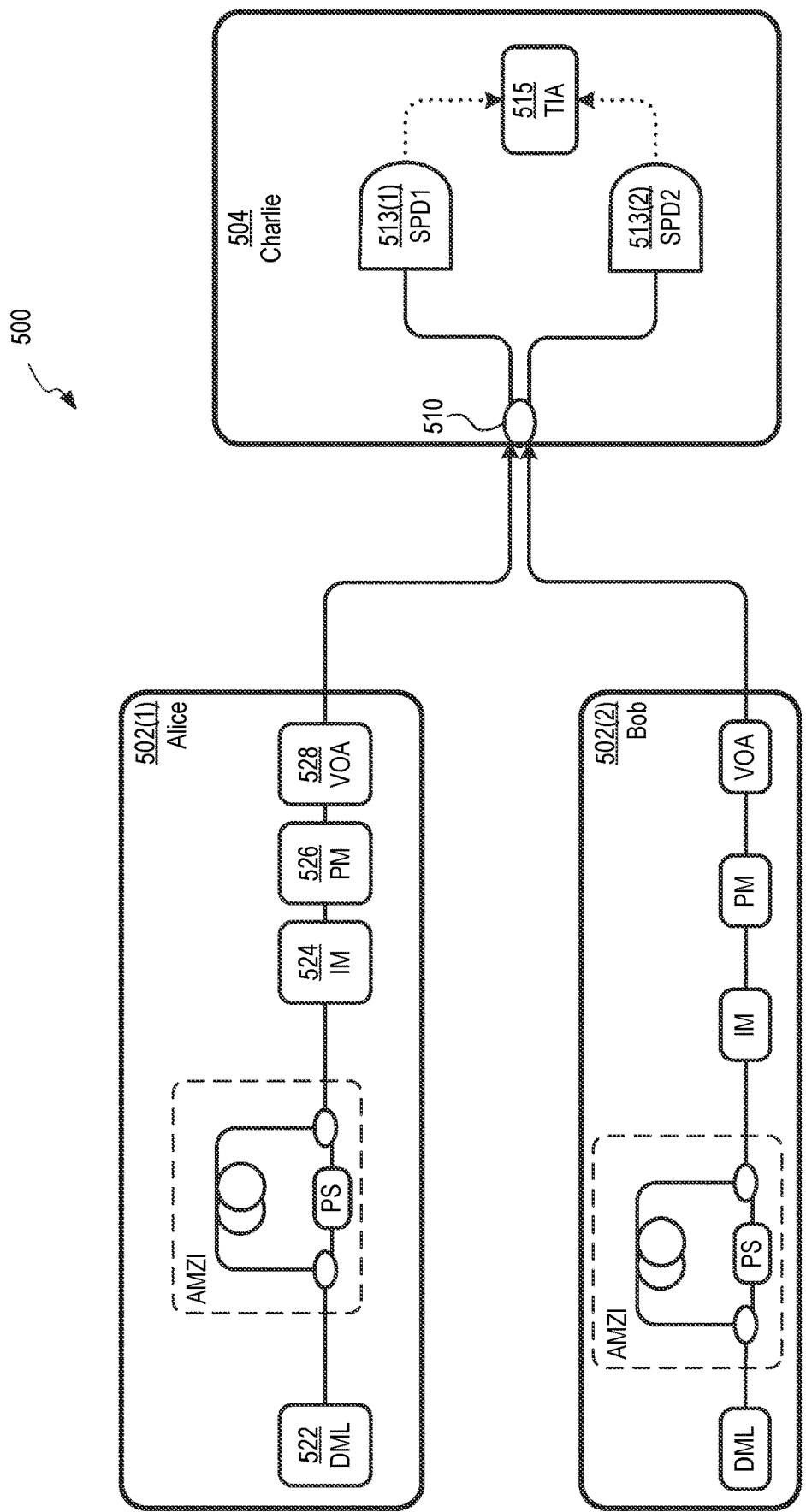
FIG. 5 shows an operational schematic of a time-bin-and-phase-encoding MDI-QKD network, in an embodiment.

FIG. 5 shows an operational schematic of a time-bin phase-encoding MDI-QKD network 500. User nodes 502(1) and 502(2), Alice and Bob, respectively, only need commercial off-the-shelf components for qubit preparation. For each user node, a directly modulated laser (DML) 522 generates a pulse train with random phases. An AMZI with unbalanced arms separates each pulse into two time-bins and the path difference between the two arms, where the path difference is longer than the coherent time of the pulse. The AMZI may have a phase shifter (PS) for further controlling the phase. In the time-bin (Z) basis, key bits are encoded in time-bins. An IM 524 allows only one of the two time-bins to pass. For example, bit 0 is encoded if the first pulse passes, whereas bit 1 is encoded if the second pulse passes. To improve extinction ratio, time-bin encoding may also be implemented by more than one IMs. In the phase (X) basis, key bits are encoded by a PM 526 on the relative phase shift (0 or π) between two pulses. A variable optical attenuator (VOA) 528 normalizes pulse intensities of two bases and attenuates each pulse to a single-photon level.

Alice and Bob independently prepare qubits and send them to an untrusted relay node 504, Charlie, for BSM. To close the loophole of the photon-number-split attack, a VOA or an additional IM can be used for decoy-state generation. At Charlie, pulses from Alice and Bob interfere at a 50:50 beam splitter 510 and are detected by two SPDs 513(1) and 513(2). The detection events are registered by a time-interval analyzer (TIA) 515. A successful BSM is defined as a coincident event where the two SPDs, SPD1 513(1) and SPD2 513(2), are triggered alternatively in two time-bins.

Table 1 below lists the BSM results of the time-bin (Z) basis. The notation "_/\_ _" represents bit 0 while "_ _/\_" represents bit 1. According to the photon bunching effect of Hong-Ou-Mandel (HOM) interference, when two indistinguishable photons interfere at a 50:50 beam splitter, the photons always exit together via the same port. Accordingly, when Alice and Bob encode identical bits, there is only one detection event, but no coincident event in two time-bins. For example, as summarized in Table 1, if Alice and Bob both send bit 0, only one of the two SPDs is triggered in time-bin 1, but there is no detection in time-bin 2. If, however, Alice and Bob encode complementary bits, there are detection events in both time-bins, and if different SPDs are triggered, a successful BSM is obtained. Consequently, in the Z basis, successful BSMs are only possible if the two users send complementary bits.

TABLE 1

| Alice | _/\_ _ (0) | _/\_ _ (0) | _ _/\_ (1) | _ _/\_ (1) |
|---|---|---|---|---|
| Bob | _/\_ _ (0) | _ _/\_ (1) | _/\_ _ (0) | _ _/\_ (1) |
| Time-bin 1 | SPD1 or SPD2 | SPD1 or SPD2 | SPD1 or SPD2 | N/A |
| Time-bin 2 | N/A | SPD1 or SPD2 | SPD1 or SPD2 | SPD1 or SPD2 |
| Successful BSM? | impossible | possible | possible | impossible |

Table 2 below lists BSM results in the X basis. For Alice and Bob, bit 0 indicates no phase shift between the two pulses in the first and second time-bins, whereas bit 1 indicates a phase shift of π. According to HOM interference, two photons with opposite phases exit the beam splitter separately. If Alice and Bob prepare complementary bits (e.g., bits 0 and 1, respectively), in the second time-bin, both SPDs will be triggered and no successful BSM is possible. However, if Alice and Bob send identical bits in each time-bin, only one SPD is triggered, and successful BSMs are possible. In summary, for the X basis, successful BSMs are only possible if the two users send identical bits.

TABLE 2

| Alice | Bit 0 | Bit 0 | Bit 1 | Bit 1 |
|---|---|---|---|---|
| Bob | Bit 0 | Bit 1 | Bit 0 | Bit 1 |
| Time-bin 1 | SPD1 or SPD2 | SPD1 or SPD2 | SPD1 or SPD2 | SPD1 or SPD2 |
| Time-bin 2 | SPD1 or SPD2 | SPD1 and SPD2 | SPD1 and SPD2 | SPD1 or SPD2 |
| Successful BSM? | possible | impossible | impossible | possible |

All other results when Alice and Bob use incompatible bases are discarded. The post-selection of successful BSM entangles the qubits from Alice and Bob, i.e., complementary in the Z basis and identical in the X basis. For example, for the Z basis, one of the user nodes needs to flip the bit; and for the X basis, no bit flip is needed. In practice, the data present in the Z basis may be used for the key generation, and the data in the X basis is used for error estimation and eavesdropping detection. Although Charlie publicly announces the BSM results, he has no information about the qubits sent by Alice and Bob. During the key sifting, data from successful BSMs are selected as raw keys. During basis reconciliation, Alice and Bob reveal their basis choices over an authenticated public channel and only keep the data when they use identical bases. Then error correction and privacy amplification are performed for key distillation.

Figure 6:
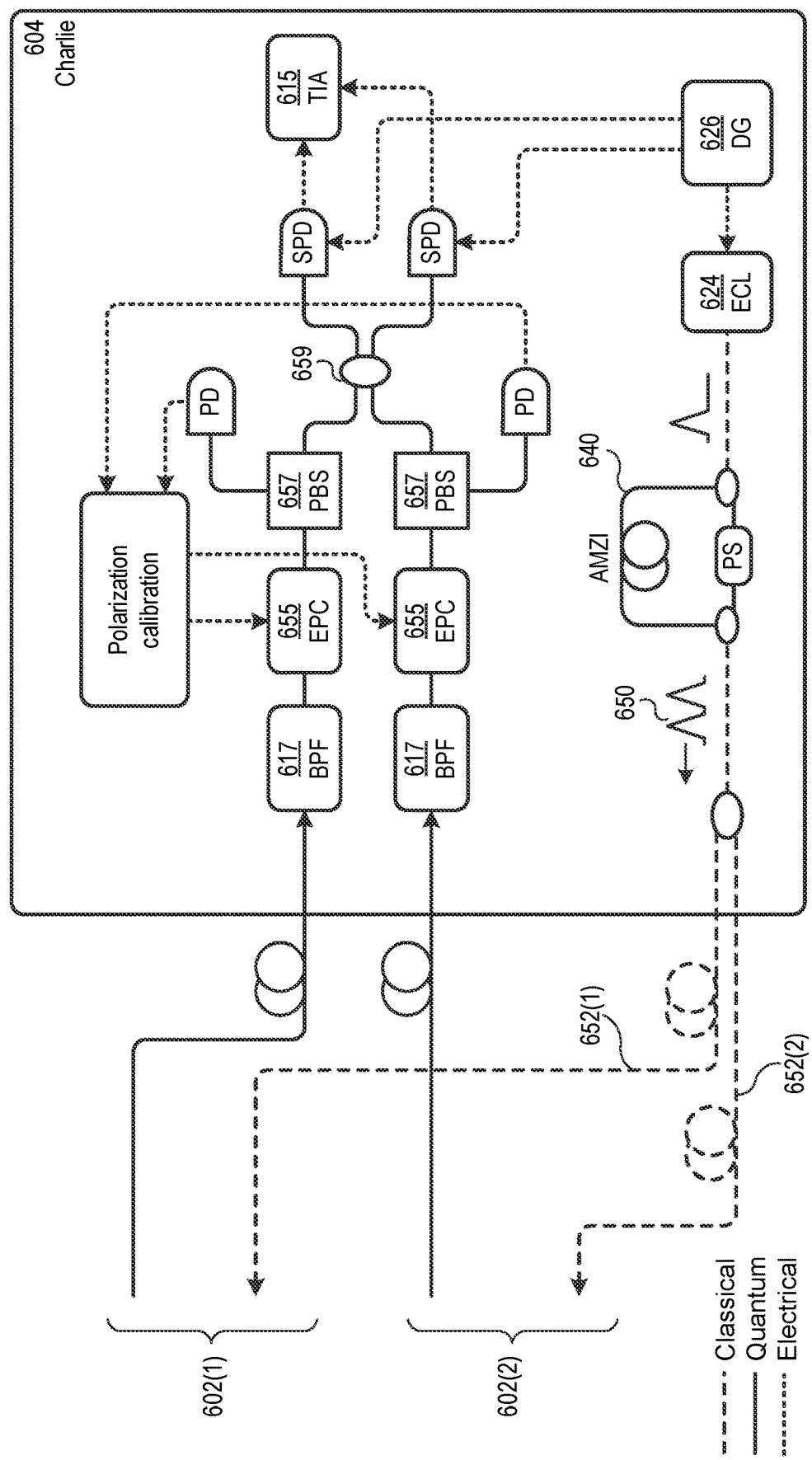
FIG. 6 is a schematic of a relay node that may be used as Charlie in a time-bin and phase-encoding MDI-QKD network, in an embodiment.
Figure 7:
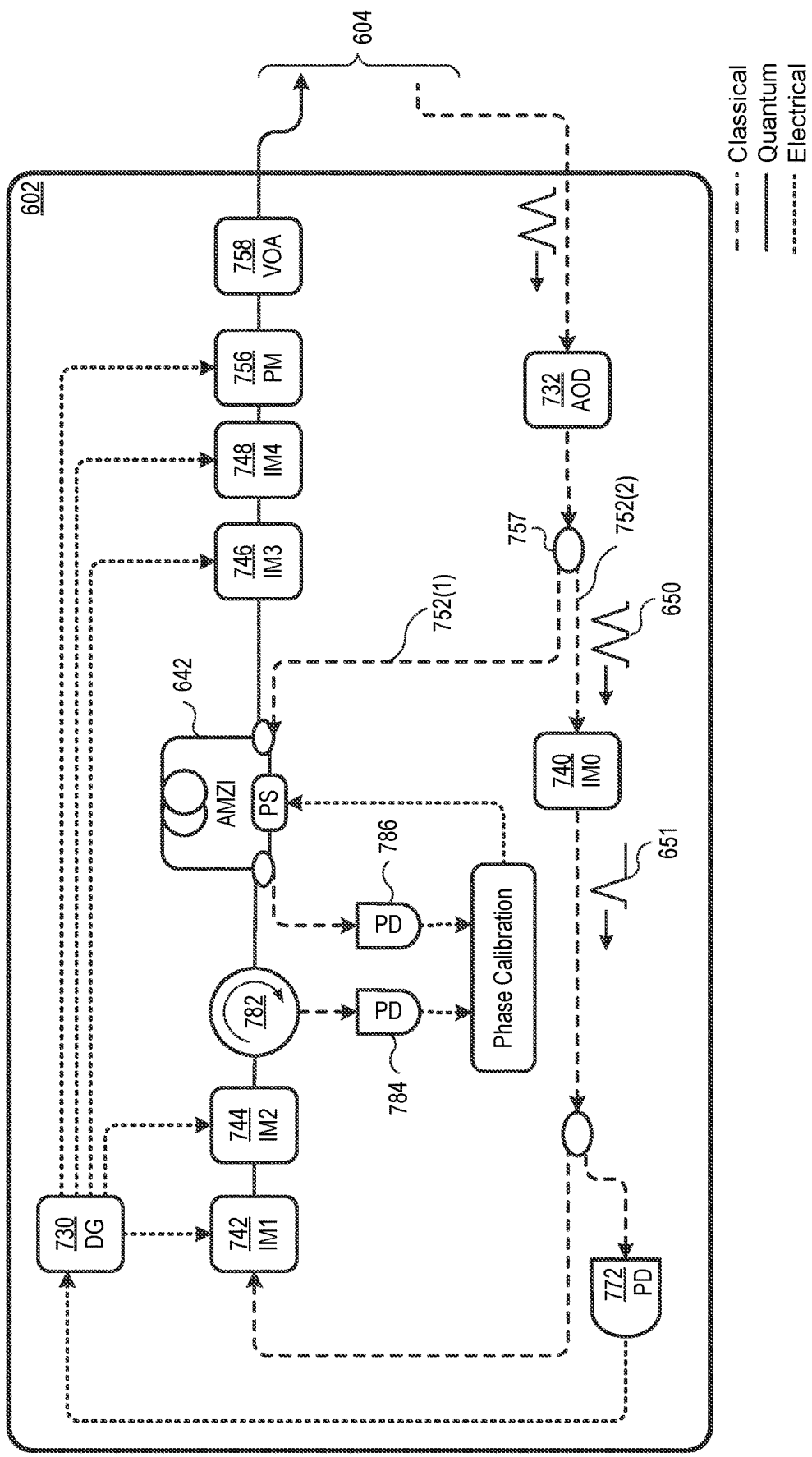
FIG. 7 is a schematic of a user node that may be used as Alice or Bob in the time-bin and phase-encoding MDI-QKD network of FIG. 6.

FIG. 6 is a schematic of a relay node 604 that may be used as Charlie in a time-bin and phase-encoding MDI-QKD network. FIG. 7 is a schematic of a user node 602 that may be used as Alice or Bob, or a user node 602(1) or 602(2), in the time-bin and phase-encoding MDI-QKD network of FIG. 6. FIGS. 6 and 7 are best viewed together in the following description. A directly modulated ECL 624 at the relay node 604 is used as a common photon source and generates a pulse train for user nodes 602(1) and 602(2). An AMZI 640 is used as a shared phase reference. Each pulse is separated into two time-bins after AMZI 640 due to the unbalanced arm lengths and then sent to users via classical fibers 652(1) and 652(2). At each user node (e.g., the user node 602 of FIG. 7), a pulse train 650 from the relay node 604 is split into first and second branches 752(1) and 752(2) by a beam splitter 757. The first branch 752(1) is fed into a user AMZI 642 for phase calibration. The second branch 752(2) goes to IM0 740, which blocks one of the two pulses of the pulse train 650 to generate a filtered pulse train 651. The filtered pulse train 651 is further split into (i) a timing pulse train, which is detected by a PD 772 for time calibration using a delay generator (DG) 730 and (ii) a pre-qubit pulse train to be encoded into a photonic-qubit pulse train.

To maximize interference visibility, indistinguishability of photons is needed from two users in terms of wavelength, phase, arriving time, and polarization. For phase calibration, reference AMZI 640 at the relay node and user AMZI 642 should have identical length differences and phase shifts between two arms. To avoid interference, the phase calibration pulses propagate through user AMZI 642 in the opposite direction with quantum pulses. A circulator 782 after IM2 744 separates the phase calibration pulses from quantum pulses. Two PDs 784 and 786 measure the optical output power from user AMZI 642 and the phase shifter (PS) inside user AMZI 642 is adjusted according to the measured power. Performed this way for all users, all user AMZIs are calibrated with respect to reference AMZI 640. However, as the phase shift between two arms fluctuates with temperature and fiber stress, errors are expected to be introduced to key bits in the X basis. To reduce the errors, AMZIs may be put in thermal containers to be isolated from temperature and stress perturbation. Advantageously, in the centralized phase calibration method as shown in FIGS. 6 and 7, only reference AMZI 640 at the relay node is put in a thermal container. In contrast, when using a conventional method (e.g., methods shown in FIGS. 3A, 3B and 4A), every user node may be required to have its AMZI in a thermal container.

For wavelength calibration, IM0 740 suppresses one of the two time-bins and uses the resulting pulse as the photon source for the subsequent modulations. IM1 742 is used for the decoy-state generation, for example by adjusting its driving voltage to produce signal states, weak decoy states, and vacuum states. IM2 744 normalizes average photon numbers per pulse for Z and X bases. AMZI 642 divides each pulse into two time-bins. In the Z basis, key bits are encoded on time-bins. IM3 746 and IM4 748 pass only one pulse and block the other. IM3 746 and IM4 748 are used in this example for an improved extinction ratio of the vacuum states; however, a single IM may replace IMs 746 and 748. In the X-basis, key bits are encoded on the relative phase shift (0 or π) between two time-bins by a PM 756. Finally, a VOA 758 adjusts the intensity of output pulses to a single-photon level. Relay node 604 then performs BSM for the two pulses sent by Alice and Bob, where they interfere at a 50:50 beam splitter 659 and are received by two SPDs.

In addition to phase and wavelength calibration, indistinguishability of photons needs to be preserved in terms of arriving time and polarization. To account for any phase difference introduced by the difference in distance between the relay node 604 and each user node, a delay system is included in each user node. The delay system in each user node, which includes DG 730 and an adjustable optical delay (AOD) 732, adjusts AOD 732 according to its distance from Charlie to compensate for the distance difference such that photons from different user nodes arrive at the same time at the interference beam splitter 659. Thus, AOD 732 may be adjustable to delay the pulse train 650 up to one-half the period of the pulse train 650. For time synchronization, all modulators at each user are synchronized to DG 730.

In operation, each user receives two time-bin pulses from relay node 604 for phase calibration. After the two time-bin pulses are delayed by AOD 732, one of the two pulses is erased by IM0 740, and the surviving pulse passing through IM0 740 is partially detected by PD 772 and then fed to DG 730 to synchronize the modulators. At relay node 604, a master DG 626 triggers SPDs, which work in a gated mode and only open the gate when photons arrive. The detection events are then registered by a time-interval analyzer (TIA) 615.

For polarization calibration, after an optical bandpass filter (BPF) 617, electrical polarization controllers (EPC) 655 and polarization beam splitters (PBS) 657 are used before the interference beam splitter 659. A PD monitors the reflected power from each PBS 657. Each EPC is adjusted according to the reflected power to make sure the incoming pulses are polarized along the p-mode and all-optical power passes through the PBS 657. The visibility of Hong-Ou-Mandel (HOM) interference can be used to monitor the indistinguishability between photons from two users. The HOM dip indicates the overall interference condition and can be used to evaluate the calibration of wavelength, phase, timing, and polarization.

Figure 8:
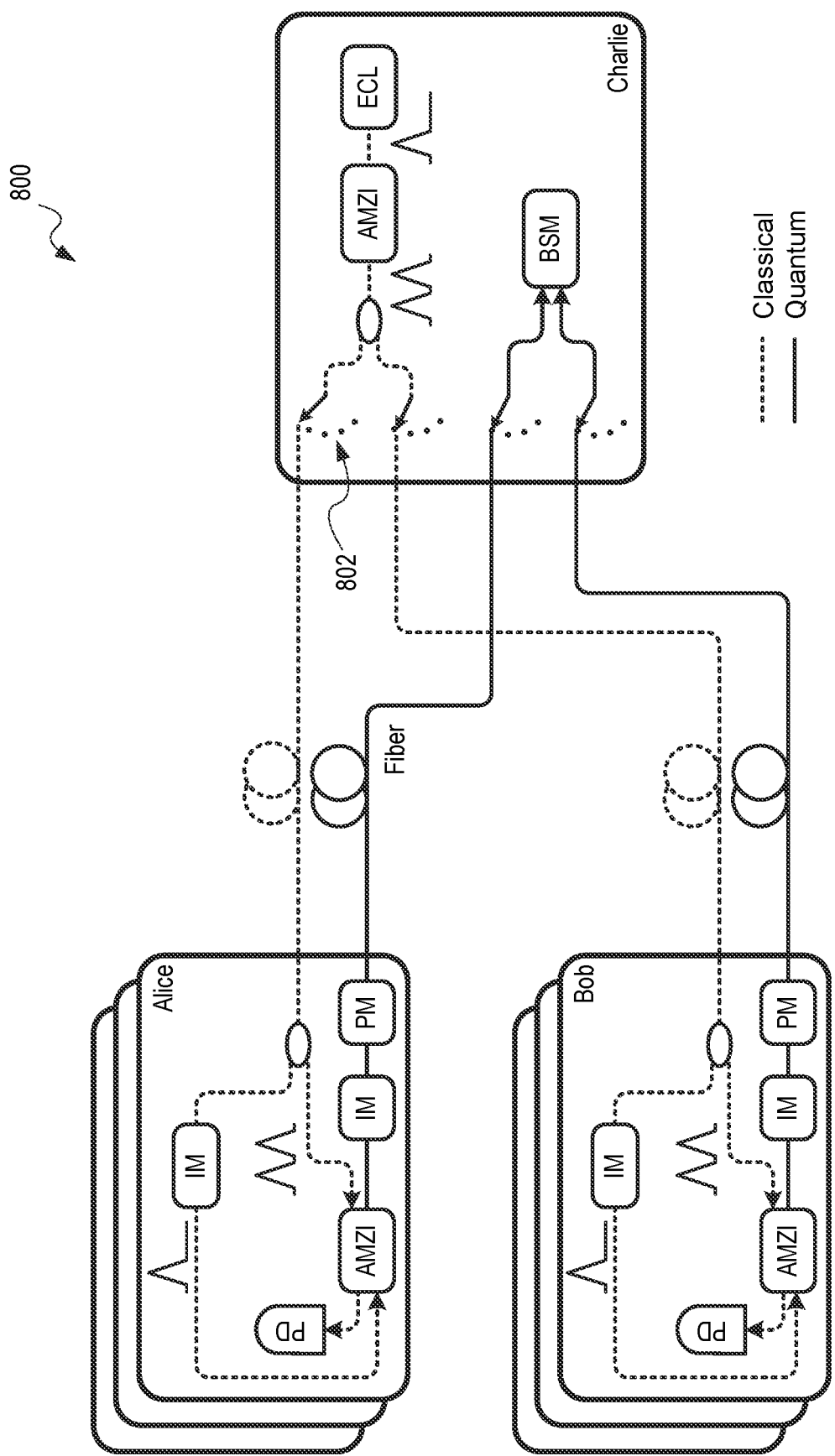
FIG. 8 shows an implementation of a scalable multi-user MDI-QKD network that utilize centralized wavelength and phase calibration technique of FIGS. 6 and 7.

FIG. 8 shows a scalable multi-user MDI-QKD network 800 that utilizes the centralized wavelength and phase calibration techniques of FIGS. 6 and 7. In the MDI-QKD network 800, Charlie is an example of the relay node 604, and Alice and Bob are examples of the user node 602. In terms of scalability, the hub, or the relay node, now includes optical switches 802 that select the pair of user nodes to connect. An additional user node (e.g., see node 602 in FIG. 7), having only commercial off-the-shelf components that include modulators, an AMZI, polarization controllers, and VOAs, may be added to the MDI-QKD network 800 and does not require any costly upgrade to the relay node or auxiliary links from existing user nodes. Consequently, MDI-QKD network 800 is a truly scalable MDI-QKD network with low operation and maintenance cost.

Disclosed herein are centralized wavelength and phase calibration techniques to enable scalable time-bin phase-encoding MDI-QKD networks. Instead of calibrating users with each other, the present embodiments calibrate the wavelength and phase of all users with respect to the relay node. Wavelength calibration is implemented using centralized optical pulse generation, where each user receives the pulses from a shared reference laser at the relay node and uses the received pulses as a common photon source. Phase calibration is realized by a centralized reference AMZI at the relay node. The phase shift in each user AMZI is calibrated with respect to the reference AMZI. Both wavelength and phase calibration links are integrated into existing classical fibers from the relay node to each user node, such that no auxiliary links among users are required. This design not only simplifies the topology of an MDI-QKD network and lowers the deployment cost, but also makes a scalable multi-user QKD network possible. For example, adding a new user to the network only requires off-the-shelf commercial components, as there is no need for expensive upgrade of the relay node or deployment of auxiliary links from existing user nodes to the new user node.

Since the key generation in MDI-QKD is based on the coincidence detection events of two SPDs, its key rate has a quadratic dependence on the detection efficiency of SPDs. So MDI-QKD has higher requirements for detection efficiency than regular prepare-and-measure QKD protocols. Thanks to the centralization of SPDs in the relay node and cost-sharing among multiple users, it is cost-effective to exploit superconducting nanowire SPDs with detection efficiency greater than 90%.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

REFERENCES

1. N. Gisin, G. Ribordy, W. Tittel, and H. Zbinden, "Quantum cryptography," Reviews of Modern Physics, vol. 74, no. 1, pp. 145-195, March 2002.
2. Q. Zhang, F. Xu, Y.-A. Chen, C.-Z. Peng, and J.-W. Pan, "Large scale quantum key distribution: challenges and solutions," Optics Express, vol. 26, no. 18, pp. 24260-24273, 2018.
3. D. Gottesman, Hoi-Kwong Lo, N. Lutkenhaus, and J. Preskill, "Security of quantum key distribution with imperfect devices," Quantum Information & Computation, vol. 4, no. 5, pp. 325-360, September 2004.
4. H.-K. Lo, M. Curty, and B. Qi, "Measurement-device-independent quantum key distribution," Physical Review Letters, vol. 108, no. 13, pp. 130503, March 2012.
5. Z. Tang, Z. Liao, F. Xu, B. Qi, L. Qian, and H.-K. Lo, "Experimental demonstration of polarization encoding measurement-device-independent quantum key distribution," Physical Review Letters, vol. 112, no. 19, pp. 190503, May 2014.
6. Y. Liu, T.-Y. Chen, L.-J. Wang, H. Liang, G.-L. Shentu, J. Wang, K. Cui, H.-L. Yin, N.-L. Liu, L. Li, X. Ma, J. S. Pelc, M. M. Fejer, C.-Z. Peng, Q. Zhang and J.-W. Pan, "Experimental measurement-device-independent quantum key distribution," Physical Review Letters, vol. 111, no. 13, pp. 130502, September 2013.
7. Y.-L. Tang, H.-L. Yin, S.-J. Chen, Y. Liu, W.-J. Zhang, X. Jiang, L. Zhang, J. Wang, L.-X. You, J.-Y. Guan, D.-X. Yang, Z. Wang, H. Liang, Z. Zhang, N. Zhou, X. Ma, T.-Y. Chen, Q. Zhang, and J.-W. Pan, "Measurement-device-independent quantum key distribution over 200 km," Physical Review Letters, vol. 113, no. 19, pp. 190501, November 2014.
8. Y.-L. Tang, H.-L. Yin, S.-J. Chen, Y. Liu, W.-J. Zhang, X. Jiang, L. Zhang, J. Wang, L.-X. You, J.-Y. Guan, D.-X. Yang, Z. Wang, H. Liang, Z. Zhang, N. Zhou, X. Ma, T.-Y. Chen, Q. Zhang, and J.-W. Pan, "Field test of measurement-device-independent quantum key distribution,"

IEEE Journal of Selected Topics in Quantum Electronics, vol. 21, no. 3, pp. 116-122, May-June 2015, Art no. 6600407.

9. Y.-L. Tang, H.-L. Yin, Q. Zhao, H. Liu, X.-X. Sun, M.-Q. Huang, W.-J. Zhang, S.-J. Chen, L. Zhang, L.-X. You, Z. Wang, Y. Liu, C.-Y. Lu, X. Jiang, X. Ma, Q. Zhang, T.-Y. Chen and J.-W. Pan, "Measurement-device-independent quantum key distribution over untrustful metropolitan network," Physics Review X, vol. 6, no. 1, pp. 011024, March 2016.

What is claimed is:

1. A method performed by a node of a quantum key distribution network, comprising:
   receiving, from a hub of the quantum key distribution network, a user-node pulse train of optical-pulse pairs, each of the optical-pulse pairs comprising a first pulse and second pulse that is temporally delayed relative to the first pulse, the second pulse having an optical phase shift relative to the first pulse;
   splitting the user-node pulse train into first and second pulse trains;
   calibrating an asymmetric Mach-Zehnder interferometer with the first pulse train such that an interferometer phase shift between first and second arms of the asymmetric Mach-Zehnder interferometer matches the optical phase shift;
   blocking the second pulse of each of the optical-pulse pairs of the second pulse train to generate a filtered pulse train;
   splitting the filtered pulse train into a timing pulse train and a pre-qubit pulse train;
   detecting the timing pulse train to generate an electronic timing signal;
   delaying the pre-qubit pulse train into a delayed pulse train;
   encoding, based on the electronic timing signal and using the asymmetric Mach-Zehnder interferometer, the delayed pulse train into a photonic-qubit pulse train; and
   transmitting the photonic-qubit pulse train to the hub.

2. The method of claim 1, wherein said encoding includes one or both of time-bin encoding and phase encoding.

3. The method of claim 1, wherein said blocking occurs synchronously with the electronic timing signal.

4. The method of claim 1, wherein said delaying is based on a temporal delay transmitted to the node by the hub via a classical communication channel.

5. The method of claim 4, wherein the temporal delay is no greater than one-half of a repetition period of the user-node pulse train.

6. The method of claim 1, wherein said receiving includes receiving the user-node pulse train via a fiber optic channel.

7. A node for a quantum key distribution network, comprising:
   an optical input operable to receive, from a hub of the quantum key distribution network, a user-node pulse train of optical-pulse pairs, each of the optical-pulse pairs comprising a first pulse and a second pulse that is temporally delayed relative to the first pulse, the second pulse having an optical phase shift relative to the first pulse;
   a first beamsplitter configured to split the user-node pulse train into first and second pulse trains;
   a modulator operable to block the second pulse of each of the optical-pulse pairs of the second pulse train to generate a filtered pulse train;
   a second beamsplitter configured to split the filtered pulse train into an timing pulse train and a pre-qubit pulse train;
   a photodetector operable to detect the timing pulse train to generate an electronic timing signal;
   an optical delay operable to delay the pre-qubit pulse train into a delayed pulse train;
   a qubit encoder including an asymmetric Mach-Zehnder interferometer, the qubit encoder being operable to encode, based on the electronic timing signal, the delayed pulse train into a photonic-qubit pulse train;
   a phase calibrator operable to calibrate the asymmetric Mach-Zehnder interferometer with the first pulse train such that an interferometer phase shift between first and second arms of the asymmetric Mach-Zehnder interferometer matches the optical phase shift; and
   an optical output operable to transmit the photonic-qubit pulse train to the hub.

8. The node of claim 7, the qubit encoder being operable to perform one or both of time-bin and phase encoding.

9. The node of claim 7, the modulator being operable to synchronously block the second pulse based on the electronic timing signal.

10. The node of claim 7, the optical delay being an electronically tunable optical delay line.

11. The node of claim 10, further comprising an electronic delay generator operable to control the electronically tunable optical delay line.

12. The node of claim 7, each of the optical input and the optical output comprising a fiber-optic port.

13. A method performed by a hub of a quantum key distribution network, comprising:
   transforming, with an asymmetric Mach-Zehnder interferometer, an optical pulse train into a double pulse train of optical-pulse pairs, each of the optical-pulse pairs comprising a first pulse and a second pulse that is temporally delayed relative to the first pulse, the second pulse having an optical phase shift relative to the first pulse;
   splitting the double pulse train into a first-node pulse train and a second-node pulse train;
   transmitting the first-node pulse train to a first node of the quantum key distribution network, the first node transforming the first-node pulse train into a first photonic-qubit pulse train;
   transmitting the second-node pulse train to a second node of the quantum key distribution network, the second node transforming the second-node pulse train into a second photonic-qubit pulse train;
   receiving the first photonic-qubit pulse train from the first node;
   receiving the second photonic-qubit pulse train from the second node; and
   performing a partial Bell-state measurement with a first photonic qubit of the first photonic-qubit pulse train and a second photonic qubit of the second photonic-qubit pulse train, the first and second photonic qubits being at least partially indistinguishable.

14. The method of claim 13, further comprising publicly announcing a result of the partial Bell-state measurement.

15. The method of claim 13, further comprising generating the optical pulse train.

16. The method of claim 15, wherein said generating comprises modulating a laser.

17. The method of claim 13, further comprising optically switching the first-node pulse train to a third node of the quantum key distribution network.

18. The method of claim 13, wherein said transmitting the first-node pulse train includes transmitting the first-node pulse train to the first node via a fiber-optic channel.

19. The method of claim 13, wherein said receiving the first photonic-qubit pulse train includes receiving the first photonic-qubit pulse train via a fiber-optic channel.

20. A hub for a quantum key distribution network, comprising:
- an asymmetric Mach-Zehnder interferometer operable to transform an optical pulse train into a double pulse train of optical-pulse pairs, each of the optical-pulse pairs comprising a first pulse and a second pulse that is temporally delayed relative to the first pulse, the second pulse having an optical phase shift relative to the first pulse;
- a beamsplitter configured to split the double pulse train into a first-node pulse train and a second-node pulse train;
- a first optical output operable to transmit the first-node pulse train to a first node of the quantum key distribution network such that the first node transforms the first-node pulse train into a first photonic-qubit pulse train;
- a second optical output operable to transmit the second-node pulse train to a second node of the quantum key distribution network such that the second node transforms the second-node pulse train into a second photonic-qubit pulse train;
- a first optical input operable to receive the first photonic-qubit pulse train;
- a second optical input operable to receive the second photonic-qubit pulse train; and
- a Bell-state measurement module operable to perform a partial Bell-state measurement with a first photonic qubit of the first photonic-qubit pulse train and a second photonic qubit of the second photonic-qubit pulse train, the first and second photonic qubits being at least partially indistinguishable.

21. The hub of claim 20, further comprising a laser system operable to generate the optical pulse train.

22. The hub of claim 21, the laser system comprising a laser and a modulator operable to modulate an intensity of a continuous-wave laser beam outputted by the laser.

23. The hub of claim 21, the laser system comprising a laser diode and a modulator circuit operable to modulate an electrical current that drives the laser diode.

24. The hub of claim 20, further comprising a third optical output and an optical switch, the first-node pulse train being transmitted from the first optical output when the optical switch is in a first position, the first-node pulse train being transmitted from the third optical output when the optical switch is in a second position.

25. The hub of claim 20, further comprising a signal-processing circuit operable to transmit a result of the partial Bell-state measurement via a classical communication channel.

26. The hub of claim 20, each of the first and second optical inputs and the first and second optical outputs comprising a fiber-optic port.

* * * * *